(12) United States Patent
Bruck et al.

(10) Patent No.: US 6,268,856 B1
(45) Date of Patent: Jul. 31, 2001

(54) SYSTEM AND METHOD FOR CONTROLLING DELIVERY OF CONTENT OVER A COMMUNICATIONS NETWORK

(75) Inventors: Timo Bruck, Mountain View, CA (US); Alan Cohn, New York, NY (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/149,410

(22) Filed: Sep. 8, 1998

(51) Int. Cl.$^7$ .............................. G06F 3/00; G06F 13/00
(52) U.S. Cl. ..................... 345/357; 345/329; 707/501; 709/217; 709/219
(58) Field of Search .................................. 345/357, 329; 707/501; 709/291, 217, 203

(56) References Cited

U.S. PATENT DOCUMENTS

| 5,305,195 | 4/1994 | Murphy | 364/401 |
| 5,572,643 | * 11/1996 | Judson | 709/218 |
| 5,877,766 | * 3/1999 | Bates et al. | 345/357 |
| 5,890,172 | * 3/1999 | Borman et al. | 707/501 |
| 6,028,600 | * 2/2000 | Rosin et al. | 345/327 |
| 6,034,680 | * 3/2000 | Kessenich et al. | 345/329 |
| 6,072,491 | * 6/2000 | Yohanan | 345/349 |

FOREIGN PATENT DOCUMENTS 0 749 081 12/1996 (EP) .
WO 93/19427 9/1993 (WO) .
WO 96/30864 10/1996 (WO) .

OTHER PUBLICATIONS

"Monitoring Corporate Information With FirstFloor Products," First Floor, Inc., 1996.

* cited by examiner

*Primary Examiner*—Raymond J. Bayerl
*Assistant Examiner*—Cuong T. Thai
(74) *Attorney, Agent, or Firm*—Workman, Nydegger & Seeley

(57) ABSTRACT

A method and system for suppressing or otherwise controlling the display of unrequested content while transitioning between first content and second content available over a communications system, such as the Internet, is disclosed. The system includes a browser device in communication with a host server and adapted to establish communication with a plurality of publishers to receive and display electronically published content, responsive to user inputs. The host server includes software with a controller and an override. Upon display of first content from a publisher and selection of second content, the controller is adapted to selectively display a default transition having intermediate content to the user prior to displaying the second content. The override is in communication with the controller and is adapted to direct the display of a defined transition to the user upon actuation, and thereby suppress the display of the default transition if the default transition is different from the defined transition.

26 Claims, 10 Drawing Sheets

```
<html>
    <head>                                              ┌─126
        <title>Link Attribute Document</title>
    <head>

<body>                              ┌─128
        Click <a href=www.site3.com>here</a> for a heavyweight transition.

┌─130
        Click <a href=www.site2.com>transition=light>here</a> for a lightweight transition.
    <body>                                        ↖─132
<html>
```

FIG. 7

```
                              ┌─134
            136─┐          ┌─138
<html>
    <META HTTP-EQUIP="wtv-transition" CONTENT="light">

<head>
        <title>Page Attribute Document</title>
    <head>

<body>
        Click <a href=www.othersite.com>here</a>
    <body>
<html>
```

FIG. 8

SYSTEM AND METHOD FOR CONTROLLING DELIVERY OF CONTENT OVER A COMMUNICATIONS NETWORK

TECHNICAL FIELD

The present invention relates generally to the distribution of information to users of a communications network, such as the Internet. More particularly, the invention relates to a method and system for overriding or otherwise controlling the display of unrequested content.

BACKGROUND OF THE INVENTION

In modem society, communications networks such as the Internet enable vast numbers of people to communicate and obtain access to a limitless variety of information across great distances. The development of the World Wide Web has enabled people with relatively little technical training to find and display information in a multimedia format using a browser device such as a personal computer or television set-top box running a browser program, such as MICROSOFT® Internet Explorer or Netscape Navigator. As a result, the number of sites and the number of users on the Internet have grown at an ever-increasing rate.

For aid in accessing the Internet, many users subscribe to Internet-access services, such as the WEBTV® Internet access network. (WEBTV is a registered trademark of WebTV Networks, Inc. of Mountain View, Calif.) The WEBTV Internet access network includes a large number of browser devices, referred to as client terminals, and at least one host, or proxy, server. The client terminals are connected to the Internet via conventional modem pools, either by Integrated Services Digital Network (ISDN) connection, telephone line, or other data link, and can directly access content on web pages established by Internet publishers. The host server communicates with the client terminals to provide a convenient, standardized interface for accessing the Internet. The host server also offers supplemental services, such as email, news reports, television program guides and enhanced access to certain Web pages for subscribers of the service.

As the audience of users of these Internet-access services has grown, so too has the potential of these services to deliver advertising content through the Internet. The Internet thus provides an effective medium by which advertisements or other information may be delivered to users. Publishers of Internet sites typically advertise using pull technology. Pull technology is so-named because a user must request information, or pull it, from a server before the information will be sent to the user's browser device. As the number of advertisers on the Internet increases, advertisers are seeking new and additional methods of delivering advertisements. Examples of known methods include the use of links on web pages to content from the same and other publishers and the use of still and animated banners and audio jingles on web pages.

It is also known to embed hidden advertisement links within a standard hypertext link to a destination Internet site. When a user selects the link, intending to go to the destination page, the user also unwittingly triggers the embedded link and is briefly shown an advertisement before the browser device continues to download the destination page. This type of interstitial advertising requires the user to wait while the browser device downloads and displays the advertisement. Interstitial advertising methods are also known in which advertising information, whether embedded in a web page or cached in the client browser device itself, is presented in response to selection of a hypertext link on a web page (see U.S. Pat No. 5,572,643 to Judson, the disclosure of which is hereby incorporated by reference).

One more recent method of providing advertisements to users is to display previously obtained advertisements to users while transitioning between Internet sites. Generally, this involves viewing content from a site and selecting content to be viewed from another site, such as by actuating a link or inputting the IP address or domain name for the selected site. Upon selection of this new site, the publisher of that site must be contacted, the content of that site downloaded and ultimately displayed to the user. The time involved for this transition step may vary from a few seconds to several minutes, depending on the magnitude of the new content, the speed at which the content is downloaded, etc. This transition period provides an opportunity for intermediate content, such as an advertisement, to be displayed to the user. This intermediate content generally is downloaded to the remote terminal, or client, during periods of idle time or periods of nonuse.

Sometimes, however, it is desirable to override or suppress the display of this intermediate or interstitial content. For example, when users transition between content from the same or associated publishers, the publisher or publishers would prefer that a competing publisher's advertisement not be shown to the user during the transition period. Similarly, a publisher may wish to prevent the display of intermediate content while a user is transitioning between a variety of related content sites.

SUMMARY OF THE INVENTION

The invention is a method and system for suppressing or otherwise controlling the display of unrequested content while transitioning between first and second content over a communications system, such as the Internet. The system includes a host server and a browser device, which are in communication with each other and adapted to establish communication with a plurality of publishers to receive and display electronically published content to a user. Responsive to user inputs to the browser device, the browser device establishes communication with the publisher of the selected content and receives and displays the selected content to the user. The system further includes software including a controller. Upon display of currently viewed content (also referred to as first content) and selection of to-be-viewed content (also referred to as second content), the controller is adapted to selectively display intermediate content to the user prior to displaying the second content. The software further includes an override in communication with the controller and adapted to prevent the display of the intermediate content upon actuation.

Many other features of the present invention will become manifest to those versed in the art upon making reference to the detailed description which follows and the accompanying sheets of drawings in which preferred embodiments incorporating the principles of this invention are disclosed as illustrative examples only.

BRIEF DESCRIPTION OF THE DRAWINGS

FIG. 7 is HTML code implementing a link attribute.

FIG. 8 is HTML code implementing a page attribute.

DETAILED DESCRIPTION OF THE INVENTION

Figure 1:
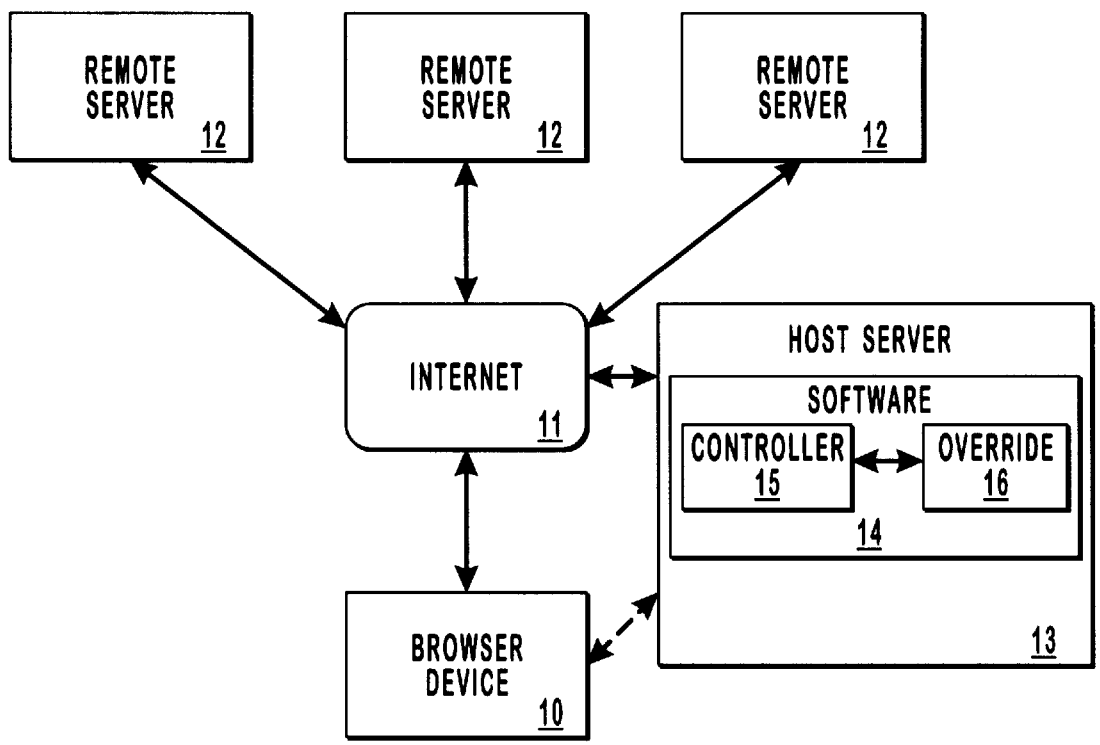
FIG. 1 is a schematic view of the structure of the invented system for controlling the delivery of content over a communications network.

The invented system for establishing communication with a plurality of publishers to receive and display electronically published content is shown schematically in FIG. 1. The system includes a browser device 10 that is capable of establishing communication with a communications network 11, such as the Internet, to obtain content from publishers for display to a user. This content is available from publishers that provide the content in an electronically transmittable format, typically via remote servers 12. Responsive to user inputs, browser device 10 downloads selected content from its corresponding publisher via the communications network and displays this content to the user.

Browser device 10 is in communication with a host, or proxy, server 13, which monitors and selectively controls the display of content to the user. In FIG. 1, browser device 10 is shown communicating with the host server via communications network 11, however, it is within the scope of the present invention that browser device 10 may establish communication with host server 13 separately from communications network 11, as shown in a dashed line in FIG. 1.

Host server 12 includes software 14 with two components, including a controller 15 and an override 16. While the browser device is establishing communication with the publisher of content selected by the user and downloading this content for display to the user, the controller 15 initiates the display of intermediate content, such as an advertisement, to the user prior to displaying the selected content. The intermediate content displayed during this transition period is not requested by the user, but instead is selected by the host server and/or publisher. The intermediate content is either downloaded upon selection of the second content by the user, or previously downloaded and stored in memory. An example of such intermediate content is disclosed in U.S. patent application Ser. No. 09/149,409, entitled "SYSTEM AND METHOD FOR DISTRIBUTING DATA OVER A COMMUNICATIONS NETWORK," filed Sep. 8, 1998 the disclosure of which is hereby incorporated by reference. The override is adapted to direct the display of content other than the intermediate content to the user when actuated, and therefore suppress the display of the intermediate content. The override also may be described as forcing a determined transition in place of the default transition, and corresponding intermediate content, described above.

FIGS. 2–5 and the following discussion are intended to provide a brief, general description of suitable browser devices in which the invention may be implemented. Those skilled in the art will appreciate that the invention may be practiced with other computer devices, including hand-held devices, multiprocessor systems, minicomputers, personal computers, networked computing environments, mainframe computers, and the like. The invention also may be practiced in distributed computing environments, where tasks are performed by remote processing devices that are linked through a communications network.

Figure 2:
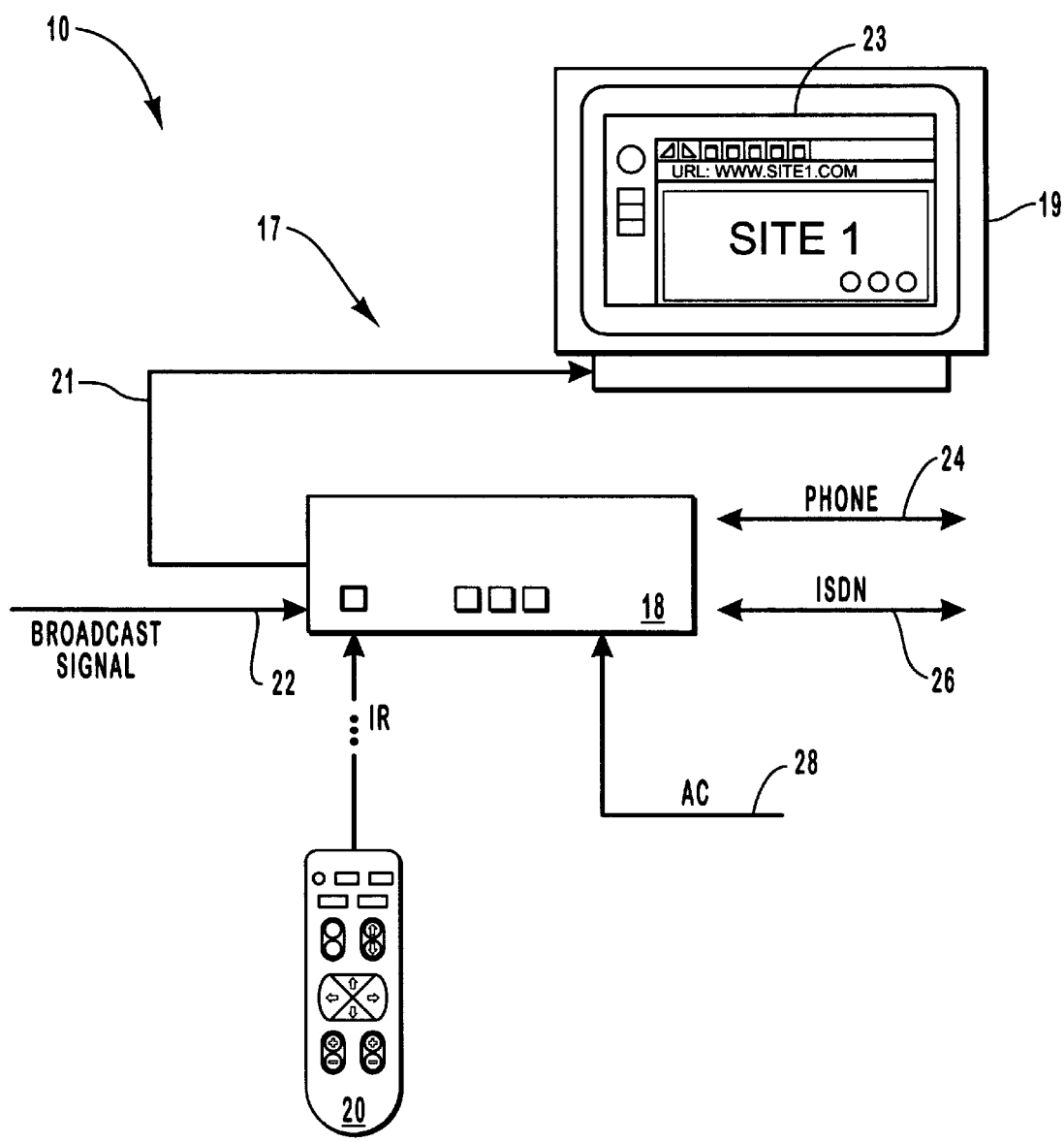
FIG. 2 is a schematic view of a browser device configured for use in accordance with the present invention.

FIG. 2 depicts an example of a suitable browser device 10, which is preferably, but not necessarily, a WEBTV client terminal 17. As indicated, terminal 17 includes an electronics unit 18, a television set 19, and may further include a remote control 20. Electronics unit 18 typically is referred to as a set-top box, because of its usual placement on top of television set 19. It will be appreciated, however, that set-top box 18 may be built into television set 19 as an integral unit. The depicted client terminal uses television set 19 as a display device for displaying both televised video data and a graphical user interface, and as a speaker for emitting audio data. The set-top box is coupled to the television set by a communication link 21. The communication link is an RF (radio frequency), S-video, composite video, or other equivalent form of communication link.

The set-top box includes hardware and/or software for receiving and decoding a broadcast video signal 22, such as an NTSC, PAL, SECAM or other TV system video signal, and providing video data to the television set via communication link 21. Set-top box 18 also includes browser hardware and/or software, which is adapted to cause a graphical user interface 23 to be displayed on television set 19, by which a user can access various WEBTV network services, browse the Web, send email, or otherwise access the Internet.

Terminal 17 may include both a standard modem and an ISDN modem, such that the communication link between set-top box 18 and the Internet can be either by a telephone (POTS) connection 24 or an ISDN connection 26. The set-top box receives power through a power line 28.

Remote control 20 is operated by the user both to control the client terminal while browser the Web, sending email and performing other Internet-related functions, and to control television viewing. The set-top box receives commands from remote control 20 via an infrared (IR) communication link. Alternatively, the communication link between the remote control and the set-top box may be by radio frequency (RF) or any equivalent mode of communication (e.g. wires, etc.).

Figure 3:
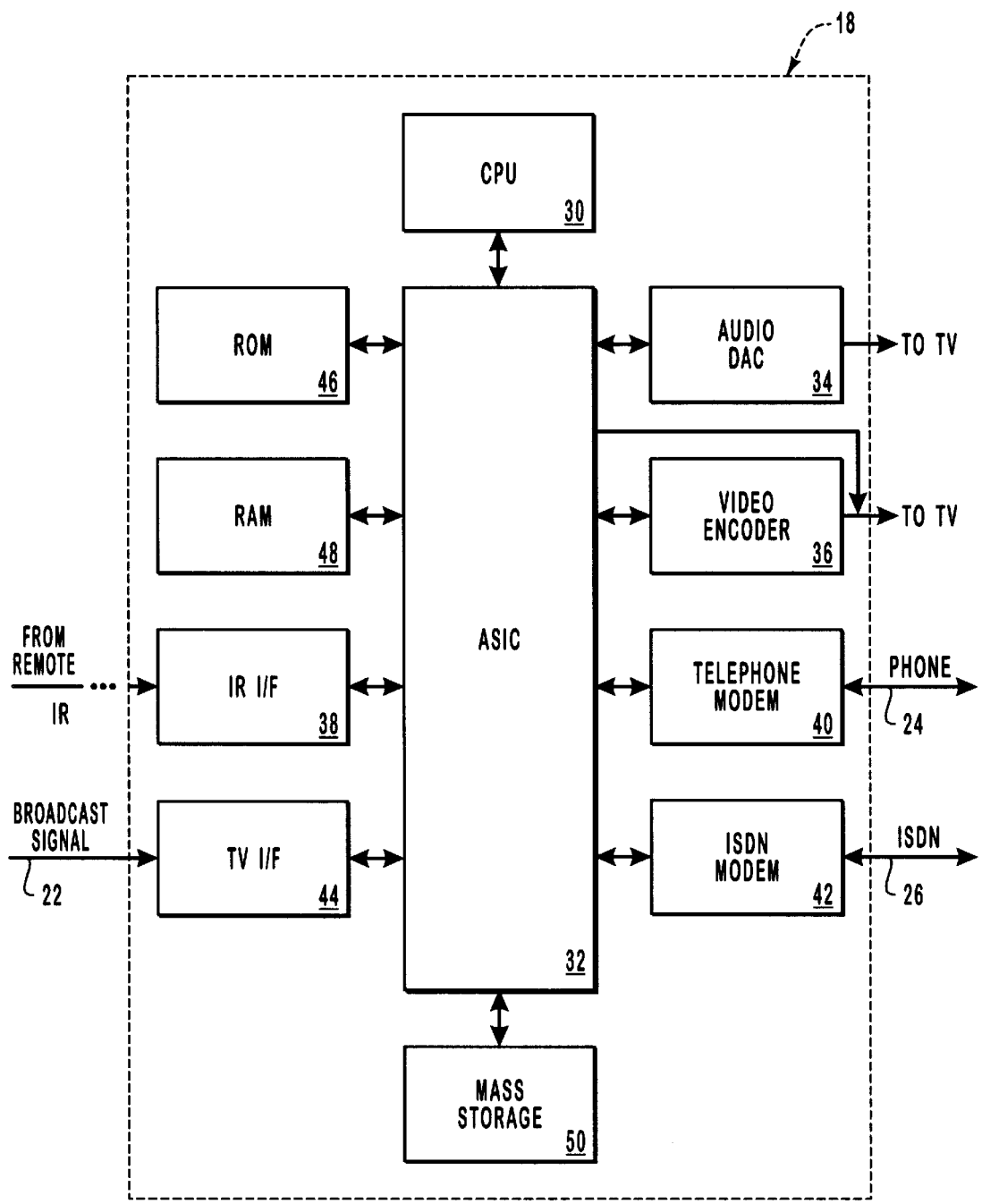
FIG. 3 is a schematic view demonstrating the architecture of the browser device of FIG. 2.

FIG. 3 is a block diagram illustrating internal features of set-top box 18. In this example, operation of the client terminal is controlled by a processing unit, such as central processing unit (CPU) 30, which is coupled to an Application-Specific Integrated Circuit (ASIC) 32. The CPU executes software designed to implement various features of the present invention. Additionally, ASIC 32 contains circuitry which may be used to implement these features. ASIC 32 is coupled to an audio digital-to-analog converter (DAC) 34 which provides audio output to television 19. In addition, ASIC 32 is coupled to a video encoder 36 which provides video output to television set 19. An IR interface 38 detects IR signals transmitted by remote control 20 and, in response, provides corresponding electrical signals to ASIC 32. A standard telephone modem 40 and an ISDN modem 42 are coupled to ASIC 32 to provide connections to the Internet.

The set-top box also may include a cable television or radio frequency modem (not shown).

A TV interface 44 is coupled to ASIC 32 to receive broadcast video signals, such as an NTSC video signal, and provide corresponding electrical signals to ASIC 32, thereby allowing video data carried in broadcast video signal 22 to be presented to the viewer on television set 19. More specifically, TV interface 44 is configured to digitize the incoming video signal, which then is stored in RAM 48, so that ASIC 32 and CPU 30 can process the video signal before displaying it on the television set. This configuration enables the set-top box, for instance, to generate shared screen viewing where the video signal only occupies a portion of the screen. The remaining screen area can be used to display various user interface controls or data, such as video programming information.

Also coupled to ASIC 32 is read-only memory (ROM) 46, which provides storage for program code for implementing application software to be executed by the set-top box. ROM 46 may be a programmable ROM (PROM) or any form of erasable PROM (EPROM) or flash memory. A mass storage device 50 optionally may be provided and coupled to ASIC 42. The mass storage device is used to input software or data to the client terminal, or to store downloaded software or data. Mass storage device 50 can be any suitable device for storing machine-executable instructions, such as a magnetic drive, optical drive, and the like.

Figure 4:
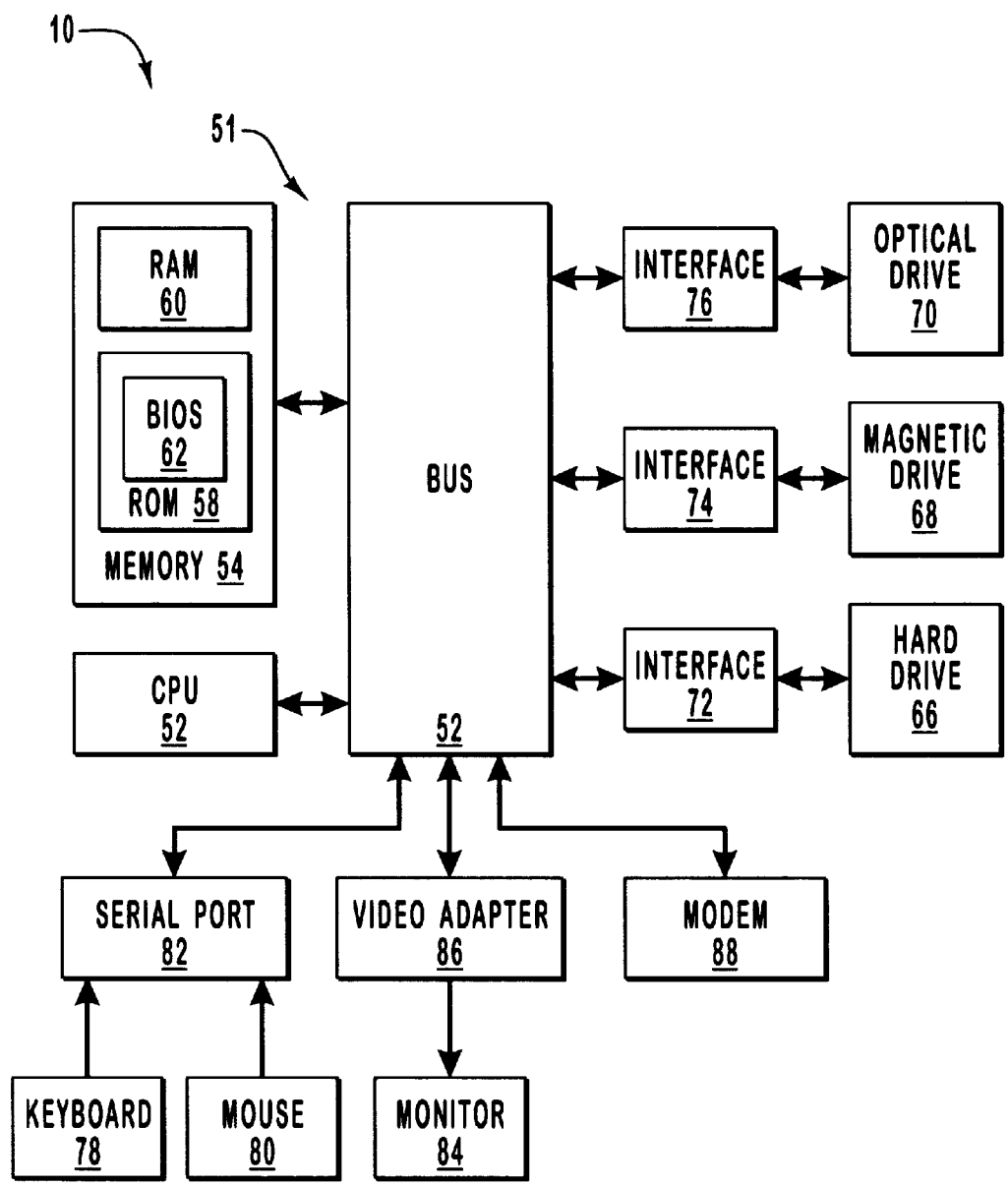
FIG. 4 is a schematic view of another browser device configured for use in accordance with the present invention.

FIG. 4 depicts an alternative embodiment of browser device 10 in the form of a conventional personal computer 51, including a processing unit 52, a memory 54, and a bus 56 that couples various system components, including the memory, to the processing unit. The bus 56 may be any of several types of bus structures including a memory bus or memory controller, a peripheral bus, and a local bus using any of a variety of bus architectures. The memory includes read only memory (ROM) 58 and random access memory (RAM) 60. A basic input-output system 62 (BIOS), containing the basic routines that help to transfer information between elements within personal computer 51, such as during start-up, is stored in ROM 58.

Personal computer 51 further includes a hard disk drive 66 for reading from, and writing to, a hard disk, a magnetic disk drive 68 for reading from or writing to a removable magnetic disk and an optical disk drive 70 for reading from or writing to a removable optical disk, such as a CD ROM or other optical media. The hard disk drive 66, magnetic disk drive 68, and optical disk drive 70 are connected to the system bus 56 by a hard disk drive interface 72, a magnetic disk drive interface 74, and an optical drive interface 76, respectively. The drives and their associated computer-readable media provide nonvolatile storage of computer-readable instructions, data structures, program modules and other data for personal computer 51.

Although the exemplary environment shown in FIG. 4 employs a hard disk, a removable magnetic disk, and a removable optical disk, it should be appreciated that other types of computer readable media which can store data that is accessible by a computer, such as magnetic cassettes, flash memory cards, digital video disks, Bernoulli cartridges, random access memories (RAMs), read only memories (ROMs), and the like also may be used in the exemplary operating environment.

A number of program modules may be stored on the hard disk, magnetic disk, optical disk, ROM 58 or RAM 60, including an operating system, one or more application programs, other program modules, and program data. A user may enter commands and information into personal computer 51 through input devices such as a keyboard 78 and pointing device 80. Other input devices (not shown) may include a microphone, joystick, game pad, satellite dish, scanner, or the like. These and other input devices often are connected to the processing unit 52 through a serial port interface 82 that is coupled to the system bus. It will be understood, however, that such devices may be connected by other interfaces, such as a parallel port, game port or a universal serial bus (USB).

A monitor 84 or other type of display device also is connected to the system bus 56 via an interface, such as a video adapter 86. In addition to the monitor, personal computers typically include other peripheral output devices, such as speakers, printer(s), and modem(s). Modem 88, for example, may take the form of an ISDN modem or telephone line modem, connected to the serial bus for communication with remote computers through a communications network. Personal computer 51 further includes browser hardware and/or software that enables the user to browse the Web, send email, and otherwise access the Internet via a graphical user interface (GUI) 23.

Figure 5:
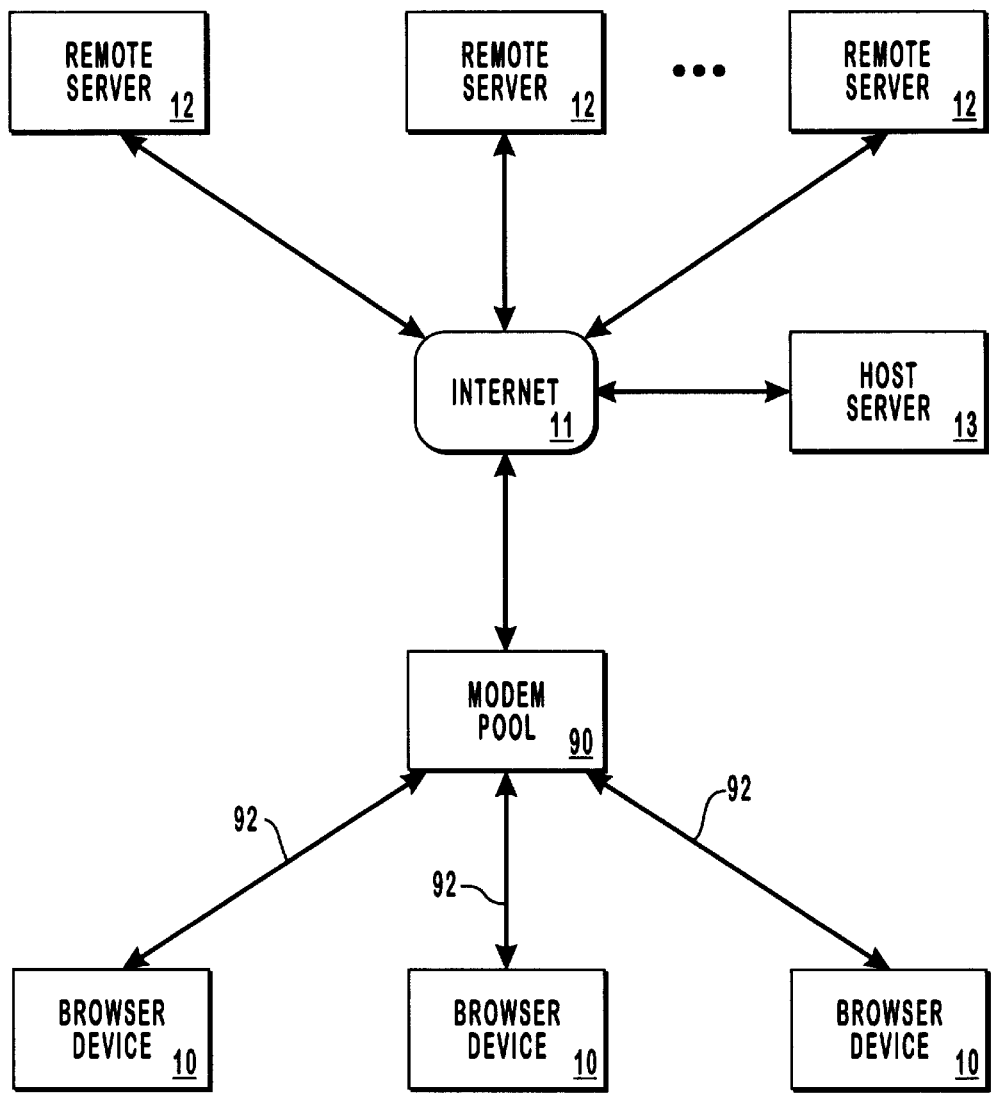
FIG. 5 is a schematic view of the structure of a communications network for use by browser devices as shown in FIGS. 2 and 4.

FIG. 5 illustrates a basic configuration of a networked computing environment in which a browser device, such as a client terminal or personal computer, typically operates. Multiple browser devices 10, including the previously described WEBTV client terminals 17 or personal computers 51, may be coupled to a modem pool 90 via direct-dial, bi-directional data connections 92, which may be telephone connections, ISDN connections, or any other similar type of connection, such as cable and satellite forward channels. The modem pool 90 is coupled typically through a router, such as that conventionally known in the art, to a number of remote servers 12 via conventional communications network 11, such as the Internet. The communications network is in communication with host server 13, which specifically supports and communicates with browser devices 10. The browser devices each have a connection to host server 13 through modem pool 90 and the Internet.

The present invention is preferably implemented on a communications network navigable by hypertext links, such as the World Wide Web. The World Wide Web encompasses a vast collection of content, such as web pages, residing as data files on remote servers connected to the Internet. Each web page is downloadable and viewable by a browser device 10, and often contains hypertext links, which, if selected, cause the browser device to select, download and display other content, such as another web page.

Within the World Wide Web, a collection of related web pages forms a web site. Individuals or organizations who provide content accessible via the World Wide Web are known as publishers. A single publisher on the Internet may establish content in the form of a single page, an entire web site, or multiple web sites. Web pages are stored as data files on remote servers and are electronically published, or otherwise transmitted, to browser devices 10 upon request from the browser devices. Each remote server 12 has a unique domain name or Internet protocol (IP) address which marks its location on the Internet. Each data file containing content has a unique file path to indicate its location within the remote server.

To download and present content from a publisher, browser device 10 establishes communication with the publisher of the selected content through the communications network 11 using a network address such as a universal resource locator (URL). Each URL contains the protocol by which the data is to be transferred, as well as the domain name or IP address at which the remote server is located and the file path of the specific file to be transferred. The remote server then transmits the requested data to the browser program, which in turn displays the data according to predefined conventions.

Data files containing web pages typically are transmitted using the HyperText Transfer Protocol (HTTP), and encoded using the HyperText Markup Language (HTML). HTML provides a standard for interpretation of text data, formatting instructions, and other behavioral attributes of electronically transmitted content (such as web pages), including links to other content or resource files containing image, video, and audio data. It should be understood that other standards, such as XML, may be developed and adopted, and that the present invention may be used with any method for transmitting, formatting and displaying content.

An example of a typical user interface, or GUI, for displaying electronically transmitted content to a user, such as via any of the browser devices discussed above, is shown in FIG. 6 and indicated generally at 100. As shown, GUI 100 includes a primary display 102, which typically includes first content in the form of data or other information requested by the user, and includes the displayed text, audio, video, etc., as well as associated formatting, layout, etc. A command input is indicated at 104 and provides a mechanism by which the user may input the domain name or IP address of second content to be downloaded and displayed to the user. GUI 100 may further include one or more links 106, which are each adapted to direct the browser device to establish communication with the publisher of second content, download the second content and display the second content to the user. This second content may include, for example, information relating to the presently displayed content, other information from the publisher from the presently displayed content, or information regarding advertisements presented on display 102.

Figure 6:
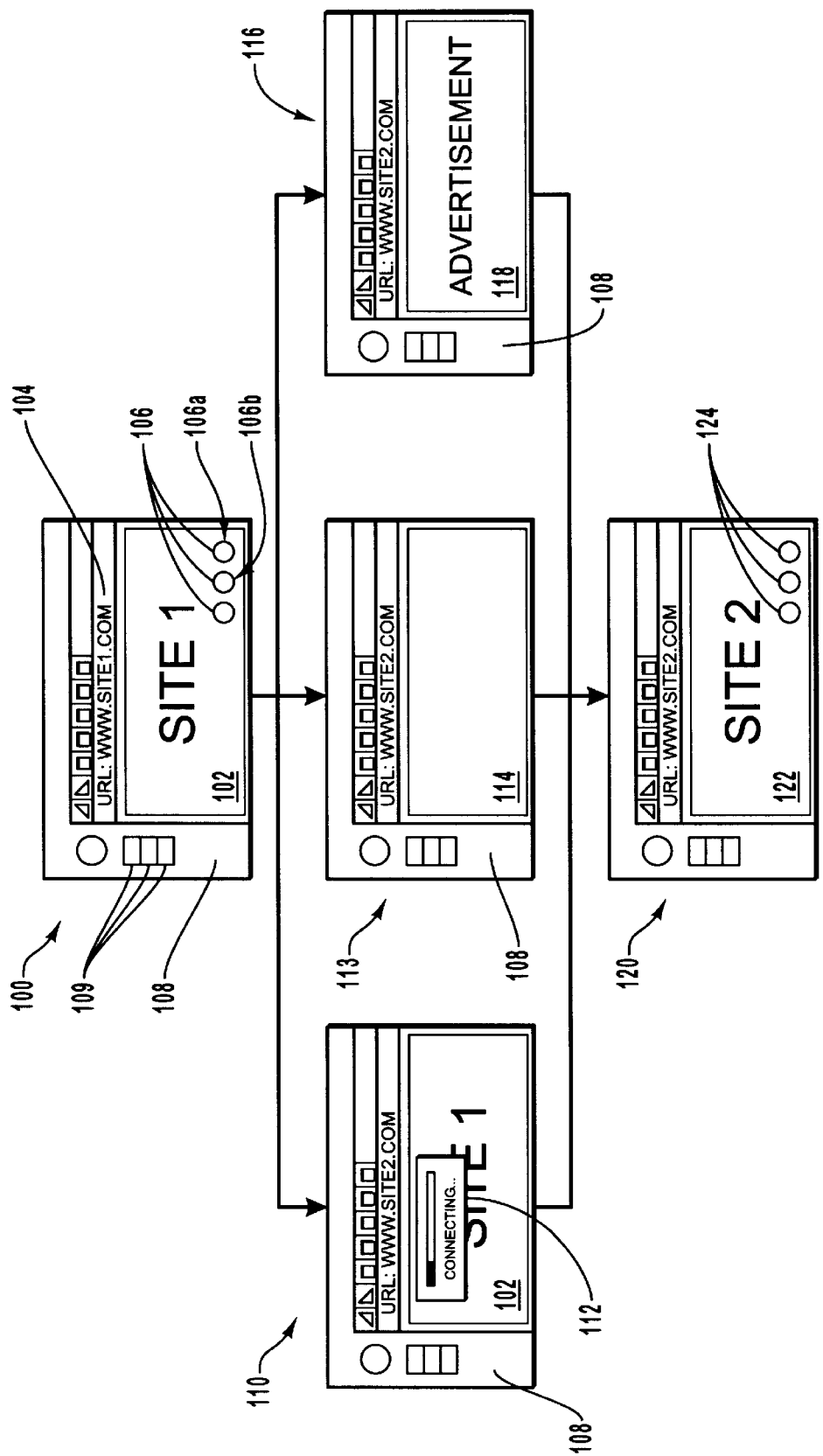
FIG. 6 is a schematic view demonstrating various display transitions available to a user when switching between displayed content.

As shown in FIG. 6, GUI 100 further includes a frame region 108 with secondary display regions 109 for presenting additional information to the user, such as local time and weather, news, the identifier of the displayed content, advertisements, links to other content, etc. Frame region 108 and its associated links and other data may be previously stored on browser device 10, downloaded from a remote or host server 12 or 13 with or before the displayed content, or may be generated independently by browser device 10. It should be understood that frame region 108 is not essential, and that any displayed GUI may or may not include such a region.

Upon selection of a link or the input of an identifier for other content, the browser device must establish communication with the publisher of the selected content, download the content, and display the content to the user. During this transition phase when the communication is being established and the content is being downloaded, intermediate content may be displayed to the user, such as in the form of one of several different transitions, discussed below. As used herein, the transition which the controller would display to the user if the override is not actuated is referred to as the default transition, while the transition forced by the override is the defined transition.

At 110, a lightweight transition is shown. The transition is referred to as a lightweight transition because most or all of the previously displayed content is still displayed to the user while the publisher of the selected content is contacted and the selected content is downloaded. Lightweight transition 110 displays the prior interface 100, including primary display 102, to the user, either as previously displayed or in a dimmed format. To this, a lightweight transition adds such intermediate content as a status display 112. Display 112 informs the user of the current status of the request to display second content (e.g. that the publisher is being contacted, that content is being downloaded and the percentage of the content already downloaded). Display 112 may further include such information as the time, date, local weather, and/or the to-be-displayed content's URL or other characteristic identifier.

At 113, one form of heavyweight transition is shown. By heavyweight, it is meant that an intermediate screen, or transition display 114, is presented to the user in place of the previously displayed content 102. It should be understood that frame region 108 may or may not still be displayed to the user. Because region 108 typically originates from a publisher other than the publisher of the displayed content, and because region 108 may have been previously stored or generated, it may remain even though the previously viewed primary content is no longer displayed. As shown at 114 in FIG. 6, the transition display is what is referred to as a "noads" display because an advertisement is not presented to the user. Instead, display 114 may include a blank or otherwise neutral (no advertisement displayed) screen, alone or including the status display discussed above in connection with the lightweight transition. Alternatively, display 114 may include information of general interest to the user, such as news, weather and stock market information.

At 116, another form of heavyweight transition is shown. Transition 116 includes intermediate content 118, which is presented to the user prior to the display of the selected content. Intermediate content may include an advertisement, and may further include links to the publisher of the intermediate content or related information. Unlike the content being downloaded, however, the intermediate content is not requested by the user, and instead is presented to the user between presentation of selected sites.

While one of the above transitions is presented to the user, the publisher of the user-selected second content is contacted and the second content is downloaded. At 120, the transition display is replaced with the second content 122, which may include its own set of links 124. The type of transition a user receives upon viewing first content and selecting second content may vary, and a system will typically have a default transition, which includes intermediate content in the form of advertisements, information, status displays, neutral screens, etc. The default transition is typically determined by the host server, and more particularly by controller 15 of software 14. Alternatively, it may be possible for the user to select the default transition via browser device 10. When transitioning between content from different publishers, it may be desirable to present a heavyweight transition with an advertisement to the user, but when transitioning between related content from the same publisher, it may be desirable to only have lightweight transitions. Also, it may be desirable to control the frequency at which a user receives a heavyweight transition with an advertisement (also referred to as an advertising transition), especially if the intermediate content must be downloaded before it may be displayed.

In the present invention, the software 13 further includes the above-described override 16, which is in communication with controller 15 and is adapted to suppress or otherwise control the display of the intermediate content upon actuation. If actuated, the override forces a selected type of transition, thereby suppressing the default transition, and corresponding intermediate content, which would otherwise be displayed. Therefore, it is possible to direct lightweight, noads or advertising transitions, according to the configuration and actuation state of the override.

One way of actuating the override is by the detection by the system of a defined attribute associated with the content currently being displayed, herein referred to as the first content. Typically, the attribute is detected by software 14. The defined attribute may be a flag or password nested or associated with the first content, such as in the HTML code, coded in the URL for the content, etc. Upon detection of this attribute, the override may automatically force a determined transition, such as a lightweight transition. For example, the publisher of the first content associated with display 102 in FIG. 6, may include in the HTML code a flag in which "password" is a defined attribute and "transition" is merely a locator telling the software where to look for the defined attribute. This may be expressed as:

transition=[password]

If this "password" is not known to the publisher, then the publisher is unable to override the system's default transition. The password may be encoded, such as with a hash function, to prevent all publishers from being able to use it. Alternatively, if it is desirable for any publisher to be able to actuate the override, the attribute may be an indicator that the override should be actuated, such as a simple "yes" or "no," as shown below:

transition=[yes|no]

In either of the above cases, the publisher is able to control whether the portion of the content associated with attribute should actuate the override. In the first example, the password could be given only to selected "authorized" publishers to control the use of the override. In the latter example, the host server could control the use of the override by maintaining a list of authorized publishers. The system could verify whether the publisher of the content containing the defined attribute was an "authorized" publisher, such as by searching databased lists of authorized and/or nonauthorized publishers. If the publisher was "authorized," the override would be actuated, and the default transition of intermediate content suppressed. If not, the override would not be allowed and the default transition, and associated intermediate content, would be displayed to the user prior to the display of the second content. In both of the above examples, however, the system, and more typically the host server, would select the type of transition to be used upon actuation of the override.

The attribute may further include a parameter, or transition-directing attribute, that identifies the specific type of transition to be used upon actuation of the override. For example, the code for a publisher's content could be expressed as:

transition=[heavy|light]

In this case, the attribute "heavy" would force an advertising transition, while the attribute "light" would force a lightweight transition. A more detailed override command could be expressed as:

transition=[normal|heavy|light|noads]

In this case, the "normal" attribute would permit the controller to function without interference from the override, and the "noads" attribute would force a heavyweight transition but would not allow an advertisement to be displayed.

With either of the above examples, control of the use of the override may be maintained either by selectively distributing a password or additional attribute, or by verifying that the publisher of content containing the attribute is authorized by the host server to use the override. Specific implementations of the above override system include actuation with link, page, target and global attributes, each of which is discussed below.

A link attribute is associated with a particular link on the displayed content and actuates the override when the link is selected. Upon selection of the link containing the link attribute, the override will force a determined transition, subject to verification of the attribute and/or verification of authorization of the publisher. Upon determining whether the publisher of the content containing the link attribute is an authorized publisher, the host server may add a header to the content reflecting whether the publisher is authorized. This header may be expressed as:

link-transition-enabled: [true|false]

An example of a HTML code for content, such as display 102 in FIG. 6, implementing a link attribute is shown in FIG. 7 and generally indicated at 126. A link 128 directs the browser device to establish communication with a publisher having the domain name site3.com to download and display the associated content to the user. As shown, link 128 does not include one of the above-mentioned link attributes, and therefore will not actuate the override. Thus, the default transition and intermediate content will be displayed to the user. At 130, however, another link is shown. Link 130 is similar to the link 128, except it is configured to direct communication with a publisher having a domain name site2.com. Furthermore, link 130 includes a link attribute 132, namely "transition=light." Upon detection of this attribute, such as when link 130 is selected, the software will force a lightweight transition in place of the default transition. As discussed, software 14 may need to verify that the publisher of the content containing the link, namely the publisher with the domain name site1.com in FIG. 6, is authorized to override the default transition.

One or more links may contain this form of defined attribute, and each link may force the same or a different type of transition. An advantage of a link attribute is that it may be used to selectively force a determined transition when a particular link is selected, while allowing the publisher to force other transitions or enable the default transition to control when other links are selected. Furthermore, it provides a mechanism to prevent advertisements from being displayed when a user transitions between related content or web sites.

To further illustrate when the above-discussed link attribute might be used, the publisher of Site 1 in FIG. 6 may wish for no advertisement to be displayed to a user when the user selects a link, such as link 106a to additional content, namely Site 2, from the same publisher. If an advertisement were displayed, it would disrupt the user's viewing of that publisher's content, but also could insert an advertisement from a competitor of the publisher. Most publishers would wish to avoid this. Therefore, the publisher would want link 106a to include a defined attribute that actuates the override, such as shown in FIG. 7 with respect to link 130. On the other hand, if the content associated with link 106b was from a different publisher, then the publisher of Site 1 may not care whether an advertisement is shown to the user. Therefore, if link 106b contains no defined attribute, similar to link 128 in FIG. 7, the default transition would be displayed upon the user's selection of the link.

When it is desirable to force a determined transition upon selection of any link from a current site, a page attribute may be used. A page attribute essentially associates a defined attribute with all links on a given site. An advantage of a page attribute is that it enables a determined transition to take place when any link on the displayed content is selected. Because all links are covered by the page override, each individual link does not need to be separately associated with a link attribute. Like the link attribute, the target attribute actuates the override upon detection by the host server. Therefore, the publisher includes the page attribute in the published content, and the host server directs the display of a determined transition in response (subject to optional verification).

An example of HTML code implementing a page attribute is shown in FIG. 8 and indicated generally at 134. As shown, code 134 includes the attribute 136, namely, "wtv-transition," which upon detection (and possible verification), actuates the override to force a defined transition in place of the default transition. If attribute 136 further includes the parameter 138 "CONTENT=light", as shown in FIG. 8, then not only is the default transition overridden, but a light-weight transition is forced in its place. It should be understood that if parameter 138 was not present, the determined transition to be displayed in place of the default transition would have to be preselected, such as by the host server. Returning to the example shown in FIG. 6, if the code of FIG. 8 was included in the content that produces display 102, the default transition and display of intermediate content would be overridden regardless of which link 106 the user selects.

It should be understood that the page attribute may be administered by the host server or by the publisher. If administered by the host server, then the software can determine whether the publisher of the currently viewed content is an authorized publisher, such as by searching the above-described databases of authorized publishers for the IP address, domain name or other characteristic identifier of that publisher. If the publisher is authorized, then the host server can add a header to that publisher's content. The header contains one of the above-described defined attributes, and thereby actuates the override upon selection of any link by the user or inputting of a URL for other content to be viewed. If administered by the publisher, a publisher can add the attribute to the code for that publisher's content. Upon detection, the override is actuated. If the system includes a verification step, then the host server can verify that the publisher is authorized to be able to override the default transition upon detection of the defined attribute.

A global attribute actuates the override regardless of the method by which the user selects the second content to be viewed. The advantage of a global override is that it is effective regardless of the particular content being displayed, the publisher of the first or second content, or the method by which the second content is selected. Whether the user selects any link, inputs a new URL, transitions back to previously viewed content, etc., the override will be actuated automatically to direct the display of the selected transition. The global attribute may be located by a publisher on that publisher's content, or alternatively, the browser device may include the attribute.

A further type of attribute for actuating the override is referred to as a target attribute. The target attribute forces a defined transition whenever the first and the second content are from the same publisher. If a publisher shift has occurred, i.e. the first and the second content are from different publishers, then the override is actuated by the target attribute to force a determined transition, thereby suppressing any transition which would otherwise be displayed. The target attribute triggers the override when there is a determined degree of correlation between the domain names of the presently viewed first content and the selected second content.

Figure 9:
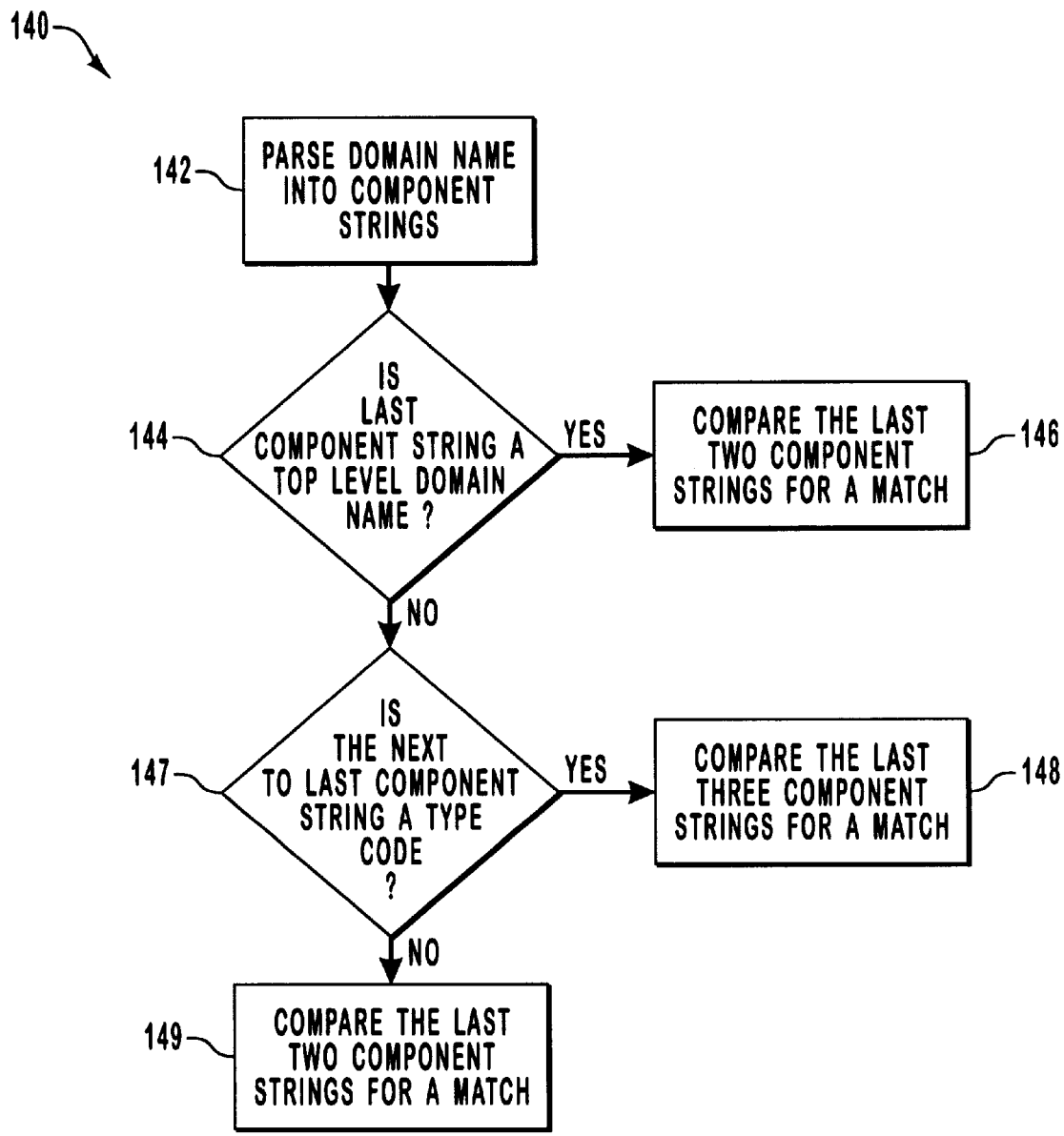
FIG. 9 is a flowchart illustrating a method for determining when a publisher shift occurs.

A publisher shift is detected by applying an algorithm which parses the domain names in each of the destination and prior viewed URLs into component strings. The algorithm is shown in a flowchart in FIG. 9 and indicated generally at 140. At 142, the algorithm first determines whether the last component string is a country code (two letters) or a top level domain name (three letters), such as .edu, .com, .org, etc. If this string is a top level domain name, then at 144 the algorithm compares the last two component strings for an exact match. If not, then the last component string is a country code (for example jp for Japan), and at 146 the algorithm determines whether the second-to-last component in each string is a type code (for example co for company). Because all country codes are two characters in length, and all type codes used with country codes are two characters in length, both country codes and type codes are tested by inquiring whether a given component string is two characters in length. Alternately, the algorithm could examine the component strings against a comprehensive database of country and type codes. If according to decision block 147, both domain names contain both country and type codes, at 148 the last three components of each are compared for an exact match. If not, at 149 the last two components are compared for an exact match. If an exact match exists, a publisher shift has not occurred. If an exact match does not exist, a publisher shift has occurred. For example, the algorithm would determine that the domain name www.microsoft.com and the domain name www.sales-info.microsoft.com are from the same publisher, but that www.microsoft.co.jp and www.yahoo.co.jp are from different publishers. It should be understood that a variety of different algorithms may be used, depending on the degree of correlation desired.

In an alternate form of implementing a target attribute, the attribute actuates the override if an identifier in the second content corresponds with the publisher of the first content. For example, if Publisher A has a first site with a domain name publisherA.com, and Publisher A also has a second site with a domain name site2.com, the above algorithm would not trigger the override because there would not be any correlation between the domain names of the sites apart from the top level domain names. Nonetheless, both of these sites are from the same publisher, and therefore it may be desirable for Publisher A to prevent an advertisement from being shown while transitioning between the publisher's sites. Therefore, if the code for site2.com contains the following flag:

transition=[publisherA]

then the override would be actuated if the attribute "publisherA" correlates with all or a component portion of the domain name of the first content.

In a variation of this form of target attribute, the host server may include a database of authorized and/or nonauthorized publishers. Upon selection of second content to be displayed, the override can search the database(s) to determine if the publisher of the selected second content is authorized, or entitled, to override the default transition. Typically, the databases contain domain names for the publishers, which are searched for a match with all or a portion of the and the domain name of the publisher of the selected content. This form of target attribute is useful because it is not dependent upon the publisher of the first, or currently viewed, content. Therefore, if the publisher of site2.com shown in FIG. 6 is selected by a user, and that publisher is authorized to override the default transition, then default transition will be overridden regardless of the identity of the publisher whose content the user was viewing prior to selecting site2.com.

Figure 10:
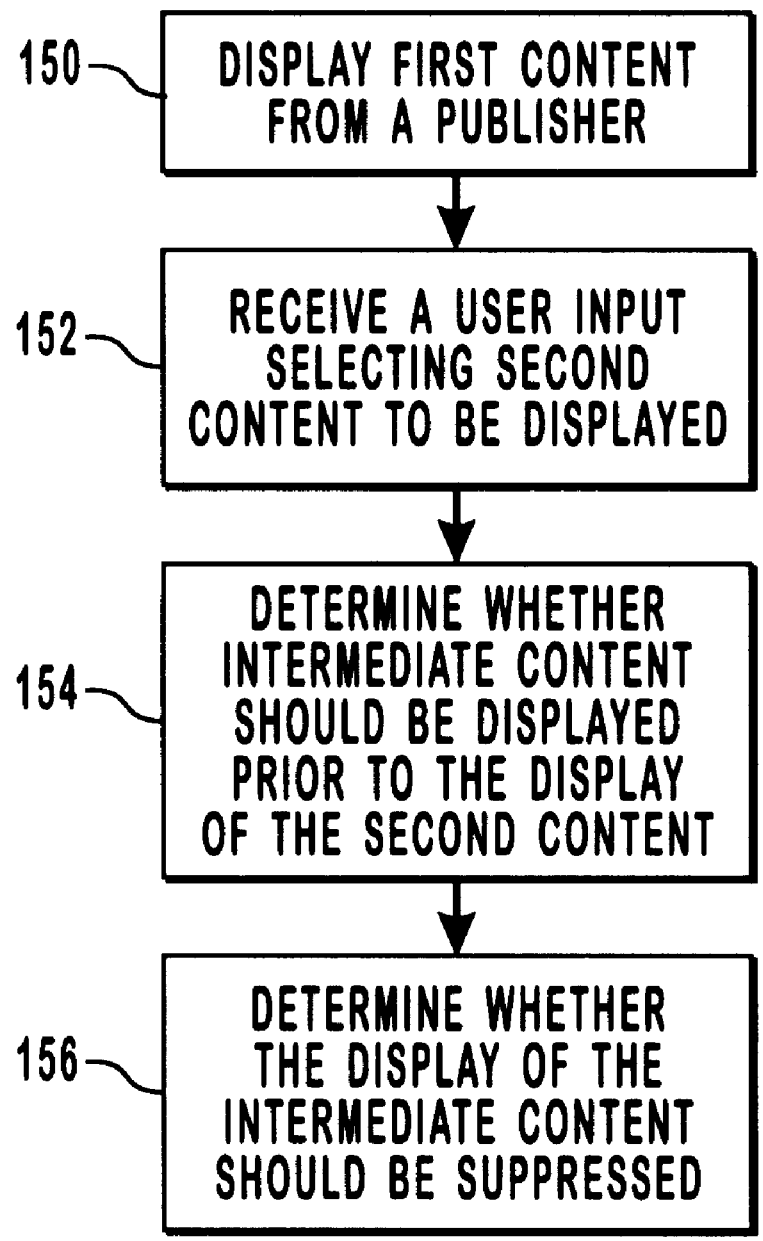
FIG. 10 is a flowchart illustrating a method for controlling the display of content over a communications network.

In FIG. 10, a method by which the system determines whether the override is actuated is summarized. At 150, first content is displayed to a user. This content is from a first publisher, and is displayed to the user via a graphical user interface, as discussed above. In step 152, a user-input is received to select second content to be displayed. The user-input may be received by selecting a link associated with the first content or the frame display, or by inputting a URL for the second content. In step 154, the system determines whether intermediate content should be displayed prior to the display of the second content. This is the default transition and associated intermediate content. At 156, the system determines whether the display of the intermediate content should be suppressed. This determination involves determining whether the override is actuated by a defined attribute, such as with the first or second content or a determined degree of correlation therebetween. If so, this may involve verifying whether the publisher is authorized to actuate the override. Furthermore, this determination may involve selecting the type of transition to be displayed to the user upon actuation of the override.

Figure 11:
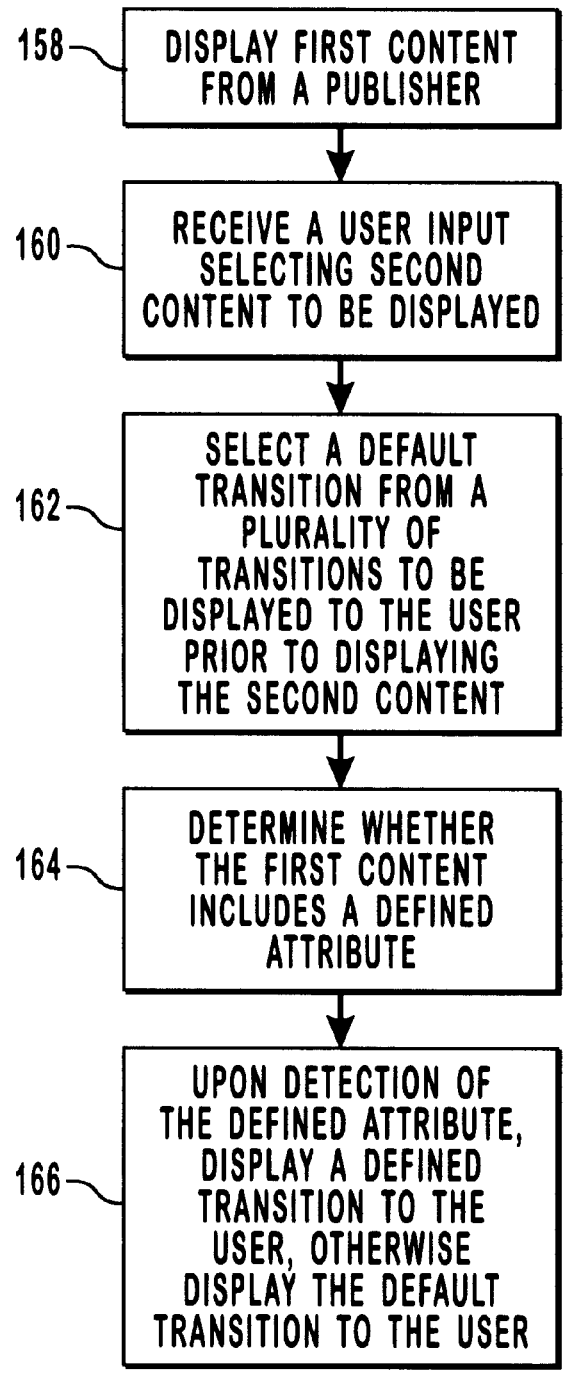
FIG. 11 is a flowchart illustrating another method for controlling the display of content over a communications network.

In FIG. 11, another way of describing the method by which the system determines what will be displayed to the user between currently viewed content and user-selected second content is summarized. In particular, FIG. 11 summarizes the steps of determining whether to display a default transition to the user or to override the default transition and display a defined transition in its place. At 158, first content is displayed to a user. At 160, a user-input selecting second content to be displayed is received. As discussed, this may include the user selecting a link, inputting a new URL, etc. At 162, a default transition for display to the user prior to the display of the second content is selected from a plurality of transitions, such as no transition or the lightweight, noads and advertising transitions discussed above. At 164, a determination is made whether the first content includes a defined attribute. If so, at 166, the defined transition is displayed to the user. If not, the default transition is displayed to the user. The defined transition may be either previously selected or otherwise determined by the system, or may be selected based on a transition-selecting component associated with the defined attribute.

While the invention has been disclosed in its preferred form, the specific embodiments thereof as disclosed and illustrated herein are not to be considered in a limiting sense as numerous variations are possible. Applicant regards the subject matter of the invention to include all novel and non-obvious combinations and subcombinations of the various elements, features, functions and/or properties disclosed herein. No single feature, function, element or property of the disclosed embodiments is essential. The following claims defined certain combinations and subcombinations which are regarded as novel and non-obvious. Other combinations and subcombinations of features, functions, elements and/or properties may be claimed through amendment of the present claims or presentation of new claims in this or a related application. Such claims are also regarded as included within the subject matter of applicant's invention irrespective of whether they are broader, narrower or equal in scope to the original claims.

What is claimed is:

1. In a server that communicates with a browser device to enable the browser device to display content, a method for controlling the display of intermediate content by the browser device during a transition period between the display of first content and second content by the browser device, the method comprising the acts of:

providing, at the server, a controller for causing default intermediate content to be displayed at the browser device during a transition period between the display of first content selected by a user of the browser device and second content selected by the user unless the display of the default intermediate content is overridden;

determining that, while the browser device is displaying first content, the browser device has requested access to second content;

determining whether the first content has an attribute that indicates that a publisher of the first content is authorized by the server to suppress the display of the default intermediate content during the transition period; and during the transition period:
if it has been determined that the first content does not have the attribute, the controller causing the default intermediate content to be displayed by the browser device during the transition period; and
if it has been determined that the first content does have the attribute, suppressing the default intermediate content, thereby enabling an authorized publisher of the first content to prevent the default intermediate content from being displayed by the browser device during the transition period.

2. The method of claim 1, wherein the first content includes a link adapted to direct selection and display the second content, the attribute being associated with the link, and the override being actuated upon selection of the link associated with the attribute.

3. The method of claim 2, wherein the attribute is further associated with all of a plurality of links of the first content.

4. The method of claim 1, further comprising the act of determining whether the publisher of the first content and the publisher of the second content are the same, wherein the act of suppressing the default intermediate content is further performed if the publisher of the first content and the publisher of the second content are the same.

5. The method of claim 4, wherein the act of determining whether the publisher of the first content and the publisher of the second content are the same comprises the act of comparing a characteristic identifier of the first content and a characteristic identifier of the second content to determine whether a determined degree of correlation exists between the characteristic identifiers.

6. The method of claim 5, wherein the first content and the second content each include URLs, and further wherein the characteristic identifiers of the first content and the second content include defined portions of the URLs of the first content and the second content.

7. The method of claim 1, wherein the first content and the second content include web pages.

8. The method of claim 1, wherein the act of determining whether the first content has an attribute is performed automatically upon selection of the second content.

9. The method of claim 1, further comprising, if it is determined that the first content has the attribute, the act of validating the attribute, and wherein the act of suppressing the default intermediate content is subject to validation of the attribute.

10. The method of claim 9, wherein the act of validating the attribute comprises the act of comparing the attribute to a database of authorized publishers, the attribute being validated if the attribute has a determined degree of correlation with one of the authorized publishers of the database.

11. The method of claim 1, wherein the default transition includes an advertisement.

12. The method of claim 1, wherein the act of suppressing the default intermediate content comprises the act of causing other intermediate content to be displayed by the browser device during the transition period.

13. The method of claim 12, wherein the attribute includes a transition-selecting component that is used to select the other intermediate content from a plurality of available intermediate contents.

14. A system for controlling the display of intermediate content to a user during a transition period between the display of first content and second content to the user, the system comprising:
   a browser device adapted to establish communication with any of a plurality of remote servers having content associated with a plurality of publishers to receive and display the content to a user, wherein responsive to user inputs selecting content, the browser device is adapted to establish communication with a remote server of the plurality of remote servers that has the selected content, receive the selected content, and display the selected content to the user; and
   a host server in communication with the browser device, the host server including software having:
      a controller for causing default intermediate content to be displayed at the browser device during a transition period between the display on the browser device of first content selected by the user and second content selected by the user unless the default intermediate content is overridden; and
      an override for overriding the default intermediate content when it is determined that the first content has an attribute that indicates that the publisher associated with the first content is authorized by the host server to suppress the display of the default intermediate content during the transition period, thereby enabling an authorized publisher of the first content to prevent the default intermediate content from being displayed by the browser device during the transition period.

15. The system of claim 14, wherein the first content includes a link adapted to direct selection and display the second content, the attribute being associated with the link, and the override being actuated upon selection of the link associated with the attribute.

16. The system of claim 15, wherein the attribute is further associated with all of a plurality of links of the first content.

17. The system of claim 14, wherein the override is actuated if the publisher of the first content and the publisher of the second content are determined to be the same.

18. The system of claim 14, wherein the first content and the second content each include characteristic identifiers, the override being further being adapted to compare the characteristic identifiers of the first content and the second content, and to be actuated upon a determined degree of correlation between the characteristic identifiers, such that the override suppresses the default intermediate content when the determined degree of correlation exists.

19. The system of claim 18, wherein the first content and the second content each include URLs, and further wherein the characteristic identifiers of the first content and the second content include defined portions of the URLs of the first content and the second content.

20. The system of claim 14, wherein the first content and the second content include web pages.

21. The system of claim 14, wherein the override is adapted to be actuated automatically upon selection of the second content.

22. The system of claim 14 wherein the attribute is a characteristic identifier of the publisher of the second content.

23. The system of claim 14, wherein the override is adapted to validate the attribute, and the suppression of the default intermediate content is subject to validation of the attribute.

24. The system of claim 23, wherein the override validates the attribute by comparing the attribute to a database of authorized publishers, the override being actuated if the attribute has a determined degree of correlation with one of the authorized publishers of the database.

25. A computer-readable medium having stored thereon a data structure that includes transition-directing content for use with a browser device for controlling the display of intermediate content by the browser device during a transition period between the display of first content and second content by the browser device, the computer-readable medium comprising:
   a data structure representing a web page including:
      first content associated with a first publisher that is displayed by the browser device in response to user input;
      a plurality of links that, when selected by the user, direct the browser device to display content other than the first content; and
      an attribute associated with at least one of the plurality of links, the attribute indicating that a publisher of the first content is authorized by the server to suppress the display of default intermediate content during a transition period between the display of the first content by the browser device and second content associated with the link with which the attribute is associated, wherein, upon selection of the link with which the attribute is associated, a server in communication with the browser device performs the acts of:
         determining that the attribute is associated with the selected link; and
         suppressing the default intermediate content, thereby enabling an authorized publisher of the first content to prevent the default intermediate content from being displayed by the browser device during the transition period.

26. A computer-readable medium as recited in claim 25, wherein the act of suppressing the default intermediate content comprises the act of causing other intermediate content to be displayed by the browser device during the transition period.

* * * * *

UNITED STATES PATENT AND TRADEMARK OFFICE
CERTIFICATE OF CORRECTION

PATENT NO. : 6,268,856 B1
DATED : July 31, 2001
INVENTOR(S) : Timo Bruck, Alan Cohn It is certified that error appears in the above-identified patent and that said Letters Patent is hereby corrected as shown below:

<u>Column 1,</u>
Line 14, change "modem" to -- modern --

<u>Column 13,</u>
Line 59, change "defined" to -- define --.

Signed and Sealed this

Second Day of April, 2002

Attest:

JAMES E. ROGAN
*Attesting Officer*     *Director of the United States Patent and Trademark Office*